United States Patent [19]
Schott

[11] 4,109,513
[45] Aug. 29, 1978

[54] LEAK DETECTOR APPARATUS

[75] Inventor: Donald E. Schott, Chester, Vt.

[73] Assignee: Thomas C. Wilson, Inc., Long Island City, N.Y.

[21] Appl. No.: 624,910

[22] Filed: Oct. 22, 1975

[51] Int. Cl.$^2$ ............................................. G01M 3/28
[52] U.S. Cl. ..................................................... 73/49.1
[58] Field of Search ............... 73/40, 40.5 R, 49.1, 73/49.4, 49.5, 49.8, 211, 396; 137/533.19; 251/24

[56] References Cited
U.S. PATENT DOCUMENTS

| | | | |
|---|---|---|---|
| 1,269,616 | 6/1918 | LeBozec | 137/533.19 |
| 1,424,461 | 8/1922 | Frankforter | 73/396 X |
| 2,313,169 | 3/1943 | Penick et al. | 73/40.5 R X |
| 2,633,739 | 4/1953 | Potts et al. | 73/49.5 X |
| 3,012,433 | 12/1961 | Blafield | 73/40.5 R |
| 3,181,367 | 5/1965 | Parilla | 73/396 |
| 3,386,466 | 6/1968 | Brunsing | 251/24 X |
| 3,969,923 | 7/1976 | Howell | 73/40.5 R |

OTHER PUBLICATIONS

"Tube Leak Detector" Description of Device and its Operation; Falls Machine Company, Akron, Ohio.

Primary Examiner—Richard C. Queisser
Assistant Examiner—John S. Appleman
Attorney, Agent, or Firm—Pennie & Edmonds

[57] ABSTRACT

An apparatus is disclosed for detecting leaks in a member defining an internal confined space. The apparatus comprises a housing, and induction means operatively connected to the housing for selectively inducing a partial vacuum therein, and valve means operatively associating with the housing and selectively movable to positions permitting pneumatic communication between a source of compressed air and the housing and between the induction means and the confined space, with the valve means further being selectively movable to a closed position by forces generated within the housing such that the valve means seals off pneumatic communication between the confined space and the induction means to maintain the partial vacuum produced in the confined space so as to enable the measurement and monitoring of the confined space for fluidic leaks by observing the vacuum pressures therein.

32 Claims, 3 Drawing Figures

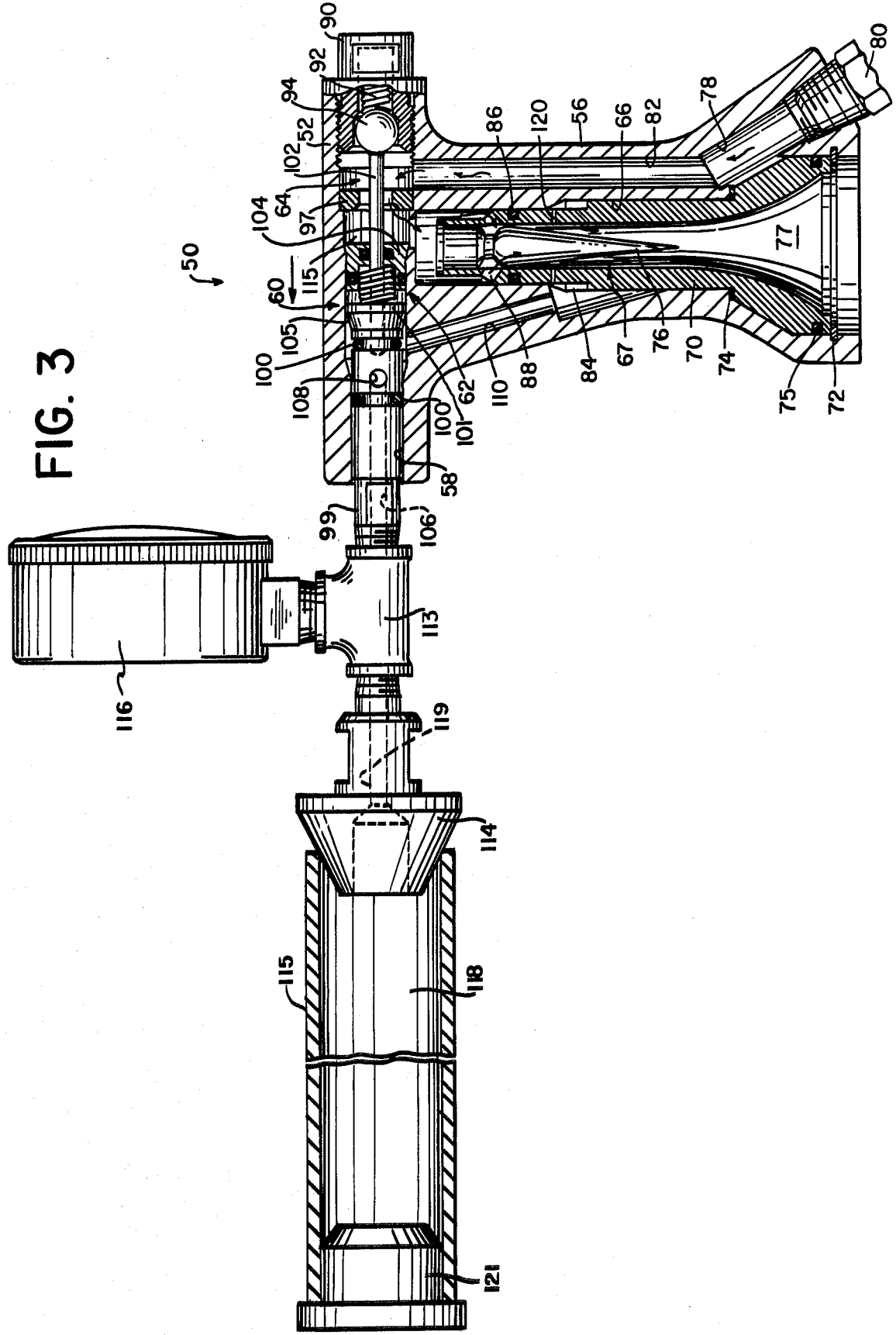

LEAK DETECTOR APPARATUS

BACKGROUND OF THE INVENTION

1. Field of the Invention

The present invention is directed to the direction of leaks in structural members. More particularly, the invention is directed to a novel and improved leak detector apparatus which is especially useful in detecting fluidic leaks in a confined space defined by a member such as a pipe.

2. Description of the Prior Art

Structural bodies, such as pipes, conduits or the like, which carry or house fluid media must be free from defects which may cause leakage. Therefore it is quite obvious that such leakage makes the structural body inefficient and it will generally fail to perform its intended function, particularly for industrial applications.

Heretofore, known arrangements have been utilized to detect certain defects in pipe structures or the like, prior to the use of such pipe structure in a particular fluidic system. One known apparatus for detecting fluidic leaks included a stopper, an air induction plug, and a leak detector device connected to the plug. The leak detector had two separate external manually controlled valves. To detect such fluidic defects as pin holes, laminations or other individual tube defects the stopper is placed at one end of the tube while the opposite end of the tube has snugly inserted therein the air induction plug. A standard fluidic hose is operatively attached to the induction plug and serves to fluidically interconnect the interior space of the tube to be tested with the detecting device.

To satisfactorily perform the testing operation through the use of the aforenoted constructionl arrangement, one of the valves which is operatively associated with the detector device is appropriately manipulated so as to draw a vacuum on the tube. Once a vacuum has been achieved, as indicated by a suitable vacuum gauge, the other valve associated with the detector device is similarly manipulated so as to move to its closed position to thereby retain the vacuum in the tube. Should the vacuum gauge indicate that there is no variance in the vacuum drawn on the tube, such result indicates the existence of the tube free from leaks which otherwise would render such tube inefficient for the purposes intended. If, on the other hand, the gauge pressure fluctuates from the initial vacuum drawn on the tube then this would indicate the existence of defects which give rise to leakage.

Although this arrangement functioned somewhat satisfactorily to detect leaks, it nonetheless suffered from certain shortcomings. one such shortcoming is that it was relatively large and required two men to satisfactorily operate it. Further all fluidic pressure controls were manually operated thereby making it relatively difficult to manipulate these valves according to the proper sequence to perform the testing operation. This increased the time needed to perform each test and thus adversely affected the efficiency and productivity of the testing operation. I have invented a relatively automatic portable apparatus to test the fluidic integrity of such pipes by a single operation and in less time thereby improving the techniques of the prior art while avoiding their limitations.

SUMMARY OF THE INVENTION

An apparatus for detecting leaks in a member defining an internally confined space which is operable by drawing a vacuum — or at least a partial vacuum — within the confined space, sealing off the vacuum thus drawn therewithin, and measuring and displaying the vacuum level thus achieved for determining the fluidic integrity of the confined space. The apparatus is adapted to be positioned in adjacent engaged relation with a member defining the confined space. The apparatus, which creates at least a partial vacuum in the confined space comprises housing means, induction means operatively connected to the housing means for selectively inducing sub-atmospheric fluidic pressure therein, and valve means operatively associated with the housing and being selectively movable to positions permitting fluidic communication between a source of relatively compressed fluid and the housing means and between the induction means and the confined space to draw at least a partial vacuum in the confined space. The valve means is movable to a closed position by forces generated within the housing wherein the valve means seals off fluidic communications between the confined space and induction means to maintain the partial vacuum thereby produced within said confined space for enabling testing of the space for fluidic leaks.

In the preferred embodiment the housing is constructed and dimensioned to be easily manually gripped and transported. To facilitate portability of the housing and thereby the versatility thereof, it may be comprised of any suitable material which is not only durable but preferably of lightweight character. The housing defines at least two major internal conduits, a first of which contains a low pressure induction means and a second containing valve means of a disc type intermediate the induction means and confined space to provide automatic and selective communication and sealing between the low pressure induction means and the second conduit. A third opening is provided and configured to accept a source of compressed air, preferably controlled by means of a valve device which facilitates selective on/off control of the compressed air directed to the housing. A conical plug constructed of a resilient material such as synthetic or natural rubber or at least having a resilient cover member, is positioned in engaged, plugged relation with an opening communicating with the confined space and communication between the low pressure induction means and the confined space is selective in the sense that it is controlled by the atmospheric conditions within the housing, while it is automatic since it is operated by fluidic pressure forces within the housing which are controlled by the source of high pressure air flowing therethrough.

In a second embodiment the flow of compressed air is continuously supplied to the entrance of the housing without a separable manual control valve. In this embodiment, control of the flow of compressed air is achieved by internal valve means actuated by positioning a conical valve plug into an opening communicating with the confined space and by physically exerting a force against the housing to overcome bias springs which retain the valve means in the inoperative — or closed — position. The valve means comprises first and second valve devices so adapted and arranged to sequentially permit entrance of compressed air into the housing and thereafter, induce a low pressure in the confined space by continued forces exerted against the housing and pipe defining the confined space.

BRIEF DESCRIPTION OF THE DRAWINGS

Preferred embodiments of the invention are described hereinbelow with reference to the drawings wherein:

FIG. 3 is a view of the apparatus of FIG. 2, in its operative state, and illustrating its use in conjunction with a generally cylindrical tube made to define a confined space by having one end thereof sealed as shown.

DETAILED DESCRIPTION OF THE PREFERRED EMBODIMENTS

Although the instant embodiments of the invention will be described for use in isolating pin hole leaks, laminations, and other individual tube defects, it will be understood, of course, that the leak detector apparatus of the present invention may be similarly used for testing boilers, condensers, or any other member defining a confined space. For the purposes of the present description the use and operation of the apparatus will be in conjunction with a confined space communicable by a pipe or tube as shown in FIG. 3.

Figure 1:
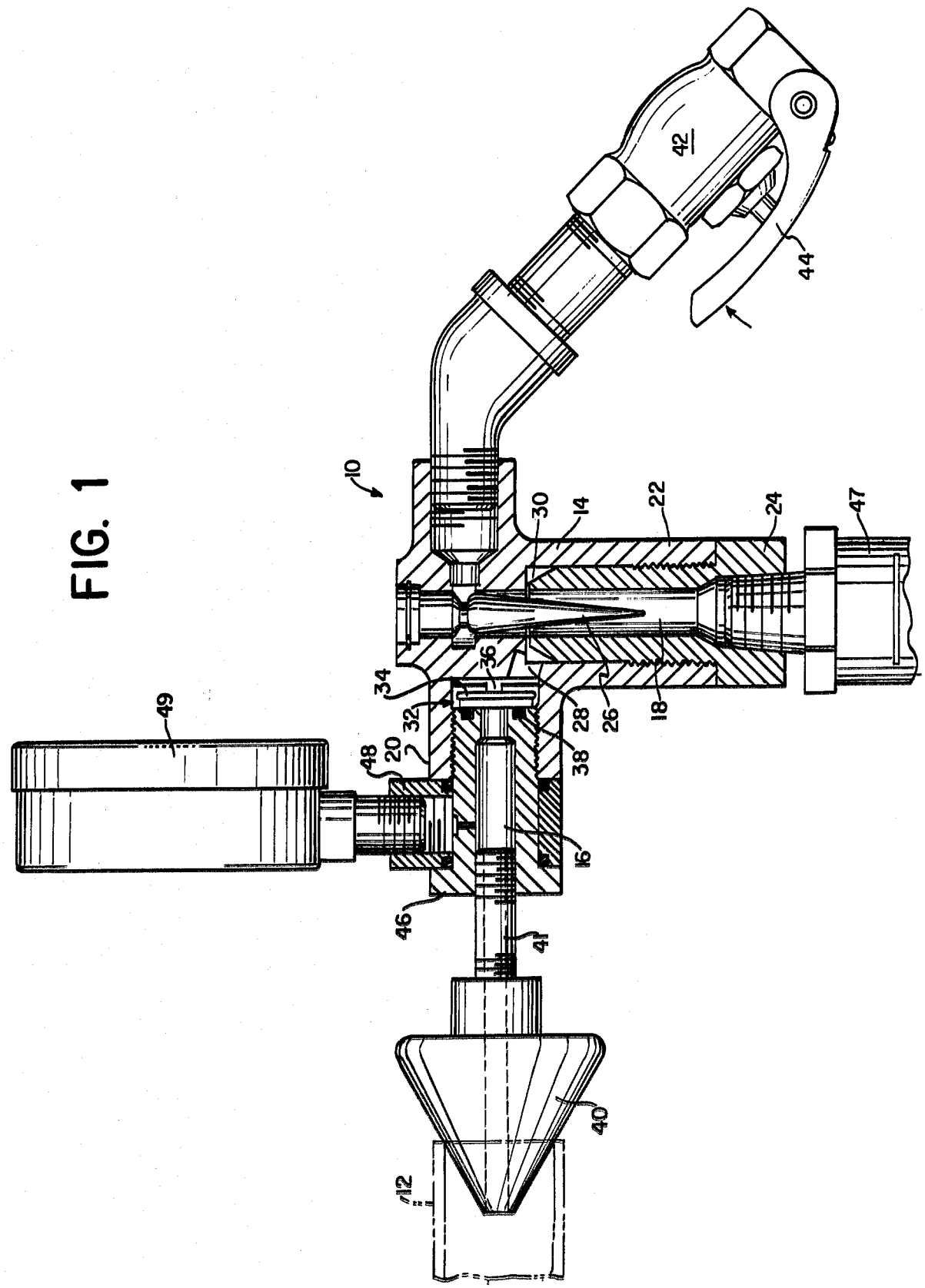
FIG. 1 is a side elevational view partly in section, illustrating the preferred leak detector apparatus of the present invention.

Referring to the drawings and initially to FIG. 1 there is disclosed my preferred leak detector apparatus 10 intended for use in detecting leaks in pipe 12 plugged at the end portion not shown, to provide a confined space therewithin. A unitary housing 14 has internal conduits 16 and 18 which are defined by barrel portion 20 and generally cylindrical handle 22, respectively. A low pressure induction device consists of jet sleeve 24 and jet needle 26 having a generally conical and tapered configuration with one blunt end portion and one tapered end portion. An internal interconnection 28 between annular space 30 between the jet sleeve and the face of the housing, and conduit 18 provides communication between the jet sleeve area and the barrel 20, while disc valve device 32 has a selectively movable disc 34 capable of moving by atmospheric pressure forces between the open position engaging lip 36, and its closed position engaging "O" ring 38. Nozzle 40 — at least the outer portion of which is of resilient material such as synthetic or natural rubber — communicates pneumatically with the barrel 20 and may be provided in several sizes, each size corresponding to openings of a separate range of pipe diameters. Valve device 42 is connected to a supply of compressed air and is used to selectively direct compressed air to the housing 14.

In operation the conical nozzle 40 is inserted into the pipe opening as shown in FIG. 1 and in a sealed relation such that the resilient nozzle material quarantees the fluidic integrity of the connection. Compressed air is selectively directed to the housing 14 by depressing control handle 44 of valve device 42 in the direction of the arrow to open the valve device thereby permitting the compressed air to be jetted into the jet sleeve and around the jet needle creating a condition of greatly reduced pressure in the constricted region or annular space according to the well-known physical principles wherein the fluid pressure decreases as the fluid velocity increases through the jet area. The annular space 30 is spaced down from the widest portion of the jet needle as shown and communicates with nozzle 40 through interconnection 28. At this stage disc valve 32 (which has limited freedom of motion) is in position against lip 36 and permits air to flow past the disc to be drawn from the pipe or tube 12 into the evacuated area surrounding the jet needle 26.

Reverse flow, however, seats the disc valve in position to the left of its central position against the "O" ring 38 in sealing contact therewith and this contact is facilitated by pressure forces caused by air rushing back into the evacuated area when the supply of compressed air is cut off by releasing handle 44 of valve 42.

Connector 46 assists in securing gauge connector 48 in the position shown to threadedly secure gauge 49 in the barrel 20 of the housing 22. Although connector 48 is pinched somewhat between barrel 20 and connector 46, it is capable of being rotated about the central axis passing through the barrel 20 so as to be held in any convenient position in a plane perpendicular to the barrel. This makes it possible to view the vacuum pressure from any convenient angle. Further universality may be obtained by removing the nozzle 41 and replacing it with a longer, or angular configured connector. Loss of vacuum would indicate a pneumatic leak in the space tested.

A muffler 47 is threadedly connected to the housing 22 as shown to maintain the noise levels of air exiting the housing to within acceptable acoustical levels. The device illustrated is contemplated to operate at approximately 90 PSI at an air flow of approximately 22 to 24 Standard Cubic Feet Per Minute (SCFM) and will produce a vacuum of approximately 25 inches of mercury (In. Hg.) minimum, and approximately 27 (In. Hg.) maximum.

Figure 2:
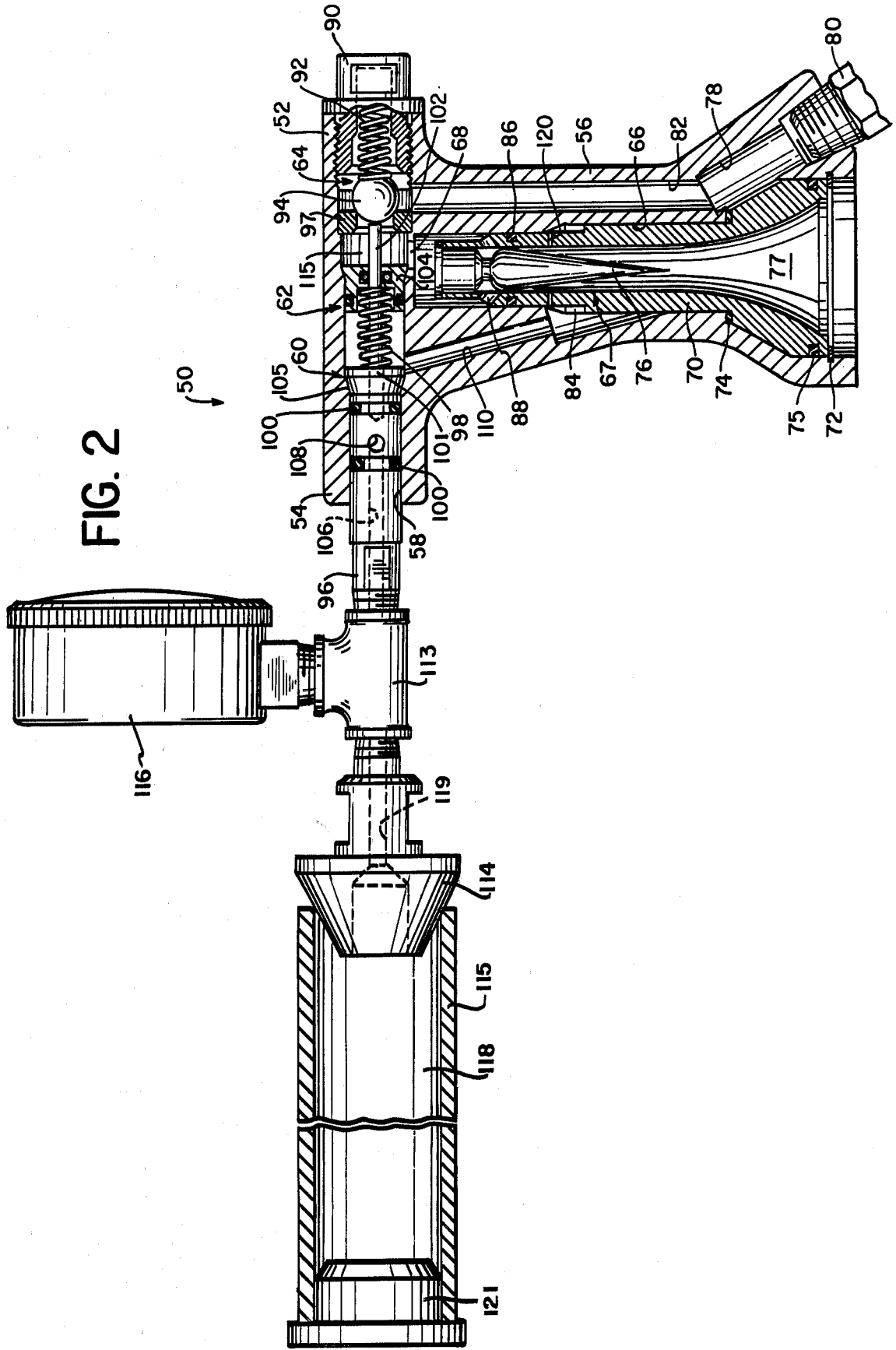
FIG. 2 is a side elevational view partly in section illustrating an alternate embodiment of the invention shown in its inoperative state.

Referring now to FIGS. 2 and 3, there is illustrated an alternate embodiment of the invention. The embodiment of FIG. 2 is illustrated with an internal valve assembly 62 in the closed condition and FIG. 3 illustrates the same apparatus with the internal valve assembly 62 in an open condition. Referring initially to FIG. 2, the apparatus 50 includes a unitary housing 52 having a barrel section 54 and a handle section 56 depending therefrom. The housing is preferably constructed of a strong lightweight material such as aluminum, and the handle is configured to be easily manually gripped similarly to the apparatus of the embodiment of FIG. 1. The barrel section 54 has a first bore 58 which slidably receives a forward valve device 60 of valve assembly 62. The valve assembly also includes a rearwardly positioned valve device 64 as will be described in further detail.

A second elongated bore 66 extends through the handle 56 and communicates with the first bore 58 through a connection orifice 68 formed at the intersection of the bores. The bore 66 extends through the handle downwardly from the barrel section 54 and is configured to accept a sub-atmospheric pressure induction device 67 as will be described.

The induction device 67 induces relatively low air pressures in the handle section and is comprised of a jet sleeve 70 secured in position within the bore 66 of handle 56 by retaining ring 72 which is retained within a peripheral groove of the handle 56 as shown. The sleeve is positioned in sealed relation by virtue of upper and lower "O" rings 74 and 75 respectively. The sleeve defines an internal air passage 77 having an upper section of relatively constant diameter and a lower section of progressively increasing diameter forming an open mouth portion in the lower end of the apparatus as shown to permit air escaping from the handle to expand into a muffler (not shown) as it exits therefrom.

A tapered jet needle 76 has a generally tapered conical configuration and forms part of the induction device 67. The needle 76 is positioned within the jet sleeve 70 with its blunt end directed upwardly facing the supply of pressurized air and the tapered portion facing the air exhaust end.

The rearward portion of handle 56 has extending therethrough, an inlet orifice 78 having coupled thereto, a fluid line 80 connected to a suitable source of pressurized compressed air which is directed into the housing through bore 82 which extends through the handle and terminates in open communication with bore 58. By this arrangement pressurized air is enabled to flow from the pressurized line 80 through passages 78 and 82 to the valve assembly 62. Although the preferred embodiment utilizes compressed air to induce relatively low pressures other pressurized gases may be utilized.

A plurality of discrete circumferentially spaced (and relatively small) communication openings 120 are formed in the jet sleeve 70 to provide pneumatic communication with an annular chamber 84 formed between jet sleeve 70 and bore 66, while "O" ring 86 seals the upper portion between the bore 66 and the jet sleeve 70.

A series of circumferentially disposed induction openings 88 are formed adjacent the upper portion of the jet sleeve 70 to direct pressurized air passing therethrough past the jet needle 76. The jet needle 76 is suitably affixed as shown with its blunt end facing the supply of compressed air. Thus any pressurized air flowing through the induction openings 88 create an area of reduced air pressure within the jet sleeve as the air is forced past the needle at elevated speeds through the constricted throat portion of the jet sleeve 70. It should be noted that although the jet induction device illustrated in FIGS. 1, 2 and 3 are in their preferred form, a jet sleeve/needle combination, any means to induce relatively low pressures within the apparatus which are suitably adaptable herein is also contemplated within the scope of the invention.

Valve assembly 62 is comprised of first and second valve devices 64 and 60 respectively as shown. Valve device 64 is of the ball type and includes an end cap 90, bias spring 92, ball valve 94, and valve seat 97 defining an opening therethrough which is closed or opened by the movements of ball valve 94. Protective end cap 90 is preferably threadedly secured to the housing as shown and defines an inner recess for accepting the spring 92 and ball 94 when the ball is moved to its open position. When the ball valve 94 is in the open position shown in FIG. 3, pressurized air entering the housing through passage 78 passes through the bore 82 and into bore 58 and jet sleeve 70. However, air is effectively precluded from passing therethrough when the ball valve 94 is seated in its closed portion as shown in FIG. 2.

The forwardly positioned valve device 60 includes a slide member 96, a bias spring 98, "O" rings 100, and valve guide 104. Slide member 96 defines a central passage 106 terminating at port 108 which communicates pneumatically with passage 110 when valve 60 is in the position shown in FIG. 3.

A fluid interconnection opening 110 extends from the general vicinity of the valve device 60 to the annular space 84 to provide selective fluid communication between the jet sleeve and the valve slide 96, while the valve slide 96 has connected thereto a "tee" coupler 113, a conical nozzle 114, and a vacuum gauge 116 capable of measuring and visually displaying the degree of vacuum in the system. The conical nozzle may be constructed entirely of a resilient material such as synthetic or natural rubber, or it may be of metal construction having a cover comprised of synthetic or natural rubber. The rearward end section of the valve slide 96 consists of a stop portion 101 which has a tapered stop shoulder 105 which cooperates with a correspondingly tapered stop configuration in bore 58 to retain the valve device in its biased closed position relative to the bore. Valve guide 104 fits securely within the first bore 58 as shown and defines a central opening 115 which receives an actuating pin 102, the purpose of which will be described in detail below.

Referring further to the forward valve device 60, coil spring 98 has one end seated in a recessed portion of valve guide 104 as shown with the opposite end of the spring engaging the rear stop portion 101 of valve slide 96. Actuating pin 102 extends through the opening of the valve guide 104 and contacts ball valve 94 as shown in FIGS. 2 and 3. It will be appreciated that whenever the pin 102 is moved linearly to the position shown in FIG. 3, ball valve 94 conjointly moves off its seat 97 to the open position. The pin 102 preferably engages the ball valve 94 when the apparatus is in its inoperative position, but this is not necessary since it is only necessary that the pin 102 extends a distance sufficient to lift ball valve 94 off its seat when the valve slide 96 is shifted toward the rearward position shown in FIG. 3. It is, however, necessary that the ball valve 94 be lifted off its seat before the valve device 60 opens as will be described so as to ensure the sequential actuation of the valve device 64 and 60, with valve device 60 opening after valve device 64.

Whenever valve slide 96 is shifted rearwardly to its rearwardmost position shown in FIG. 3, fluid passageway 110 serves to communicate annular chamber 84 with the valve device 60. Thus when the nozzle 114 is positioned in forced engaged and sealed relation with a tube 115 having one end sealed off by plug 121 as shown to define a confined space, valve device 60 is shifted to its open position and enables communication between the confined space 118 and the annular chamber 84, via the passage 110 by virtue of the central openings 119 and 106 extending through the nozzle 114 and the valve slide 96, respectively.

The aforementioned constructional arrangement of the leak detector apparatus 50 of the present invention operates in the following preferred manner. For an operator to test a confined space 118 in the tube 115 shown in FIGS. 2 and 3, one end is initially plugged with stopper member 121. The tapered nozzle 114 is then appropriately inserted into the opposite open tube end as shown. Since the apparatus 50 may be conveniently gripped by hand, an operator merely has to push the housing 54 toward the tube 115. The valve assembly 64 will correspondingly slide with respect to the housing 54 from its rest position indicated in FIG. 2 to a first position in which ball valve member 94 is lifted from seat 97. Thus, the valve slide member 96 overcomes the bias of the coil spring 98 and the conjoint movement of pin 102 overcomes the bias of spring 92. In this manner, the pressurized air is permitted to travel from the bore 82 through opened valve 64 into connection orifice 68 and into the jet sleeve 70.

As pressurized air travels through the induction openings 88 and around jet needle 76 an area of relatively low pressure is created. The low pressures developed are sufficiently low that they cause air to be drawn through communication openings 120. Upon continued sliding relation movement of the valve assembly 64 in response to the forcing motion applied on handle 56, the outlet port 108 of the valve device 60 is moved to a second position, such as indicated in FIG. 3, in which it communicates with the passageway 110 and annular chamber 84. By virtue of the relatively reduced air pressure in the jet sleeve 70, air within annular chamber 84 and confined space 118 is drawn through the communication openings 120 in jet sleeve 70. Consequently, at least a partial vacuum is induced in the confined space 118. Whenever a suitable pressure or vacuum is attained in the confined space, the operator merely releases the pressure applied to the handle so as to enable the springs 98 and 92 respectively, to return valve slide member 96 to its initial rest position (FIG. 2) whereas the tapered stop shoulder 105, of rear stop portion 101 of valve slide 96 abuts the stop shoulder defined by bore 58. As a result of such movement the ball valve member 94 returns to its seated position on the valve seat 97. In addition, outlet port 108 of valve device 60 no longer communicates with the fluid interconnection passage 110. Since both valves 64 and 60 are then sealed off, fluid communication only exists between the confined space 118 and the vacuum gauge 116. Thus the vacuum measurement is an indication of the integrity of the induced partial vacuum in the confined space. Should a leak exist in the tube, the resultant increase in pressure registered by the gauge 116 will indicate the extent of the leak.

Thus by means of a lightweight device as disclosed in both embodiments herein, I have made it possible to measure and monitor the integrity of tubes, pipes and the like, quickly and efficiently within acceptable levels of commercial accuracy. Whereas in the first preferred embodiment described herein the sequence of valve operations are automatically controlled by the pressure differentials which occur during operation, such sequential operation is structurally incorporated into my second (or alternate) embodiment and requires additional control on the part of the operator. Although both the leak detectors of FIG. 1 and FIGS. 2 and 3 disclosed herein are relatively simple to construct, it is due to this structural incorporation of the sequentially operated valve devices that the second embodiment disclosed herein is considerably more complex and expensive to construct than the first. With either embodiment disclosed it is possible to evacuate approximately 175 cubic inches (Cu. Ins.) volume to approximately 25 to 27 inches of mercury (27 Ins. Hg.) in approximately 12 to 14 seconds with a consumption of about 22 SCFM at 90 PSIG.

To summarize, the devices disclosed herein are compact, versatile and portable and automatically and sequentially enable the initial introduction of a sub-atmospheric pressure area sufficient to cause at least a partial vacuum in a confined space, and thereafter enable the confined space to communicate with such area of sub-atmospheric pressure and enable the confined space to be sealed off in response to relative sliding movement between the valve assembly and housing so as to facilitate the subsequent monitoring of the confined space by a gauge. In addition, my leak detection devices are relatively simple in construction yet operate in an extremely efficient and reliable manner.

I claim:

1. An apparatus adapted to be positioned in adjacent engaged relation with a member defining a confined space for creating at least a partial vacuum in said confined space which comprises: housing means having a first section and a second section, said second section being angled relative to said first section and configured for gripping; induction means operatively connected to said housing means for selectively inducing sub-atmospheric fluidic pressure therein; valve means operatively positioned within said housing means to selectively permit fluidic communication between a source of relatively compressed fluid and the housing means and between said induction means and said confined space, said valve means including at least a first valve device movable by forces generated within the housing at least to a closed position which forces urge said valve device along a predetermined linear path generally parallel to the axis of said first housing section so as to move said valve device into engagement with a corresponding valve seat so as to seal off fluidic communication between said confined space and induction means to maintain the partial vacuum thereby produced in said confined space for enabling testing of said confined space for fluidic leaks.

2. The apparatus according to claim 1 further comprising monitoring means operatively communicating with the confined space for monitoring fluidic pressure in the confined space.

3. The apparatus according to claim 1 wherein said first valve device is positioned intermediate said induction means and said confined space and connected and adapted to move between said open and closed positions in response to fluidic pressure conditions within the housing.

4. The apparatus according to claim 3 wherein said valve means further comprises at least a second valve device operatively connected to said induction means and operable to selectively introduce pressurized air to said induction means for creating the relatively sub-atmospheric pressure within the housing means.

5. The apparatus according to claim 4 wherein said first valve device comprises a pressure responsive disc valve selectively automatically movable between said open and closed positions by forces generated internally of said housing means.

6. The apparatus according to claim 1 wherein said housing defines interconnection means for fluidically interconnecting said valve means to said induction means.

7. The apparatus according to claim 6 wherein said interconnection means comprises an internal open portion defined within said housing means.

8. The apparatus according to claim 4 further comprising monitoring means for measuring fluidic vacuum pressure in the confined space; and coupling means communicating with said first valve device and being operatively connected to said monitoring means for permitting said monitoring means to communicate with the confined space.

9. The apparatus according to claim 8 wherein said housing means including a barrel section connected to said coupling means enabling said vacuum measuring means to be secured thereto in a manner to be rotated about a plane substantially perpendicular to the axis of said barrel section to facilitate visual observations of pressures recorded by said monitoring means.

10. The apparatus according to claim 4 wherein said valve means further comprises a conical nozzle member insertable in sealed communicating relation with openings of several sizes communicating with the confined space.

11. The apparatus according to claim 10 wherein said conical tapered nozzle is at least covered with a resilient material which facilitates sealed communication with an opening communication with the confined space.

12. The apparatus according to claim 11 wherein said resilient material is at least one of synthetic and natural rubber.

13. The apparatus according to claim 1 wherein said induction means comprises at least one jet sleeve and tapered jet needle, said sleeve defining an internal passageway communicable with said valve means, and said jet needle being operatively positioned within said internal passageway to selectively introduce air at elevated pressures for producing an area of sub-atmospheric pressure within said internal passageway to create at least a partial vacuum therein.

14. The apparatus according to claim 13 further comprising means operatively connected to said induction means to muffle the intensity of noise produced by said induction means and air at elevated pressures passing thereby.

15. The apparatus according to claim 1 wherein said valve means further includes a second valve device movably supported within said housing means for movement from a first open position to a second closed position whereby movement to said first position enables said induction means to initially induce a sub-atmospheric pressure in said housing means, said first and second valve devices being operatively interconnected such that whenever said second valve device is in said first open position said first valve is in an open position to permit fluidic communication between the confined space and said induction means for inducing at least a partial vacuum in the confined space, and movement of said second valve device to said second closed position seals off the confined space to enable monitoring of the at least partial vacuum thus produced in response to relative movement of said first and second valve devices with respect to said housing means.

16. The apparatus according to claim 15 further comprising monitoring means operatively communicating with said valve means for monitoring pressure within the confined space.

17. The apparatus according to claim 16 wherein said first and second valve are biased to their closed positions and operatively connected together in a manner capable of being sequentially actuated in response to the relative movement with respect to said housing means.

18. The apparatus according to claim 17 wherein said first and second valve devices respectively include first and second spring biasing means each adapted to bias said first and second valve devices to their closed positions.

19. The apparatus according to claim 18 wherein said housing means includes interconnection means fluidically interconnecting said first valve device to said induction means.

20. The apparatus according to claim 19 wherein said interconnection means is defined by an internal opening within said housing means.

21. The apparatus according to claim 20 wherein said first valve device comprises a slide member slidably movable with respect to said housing means and having an outlet port defined thereby, actuator and means extending from and conjointly movable with said slide member, said interconnection means fluidically interconnecting said outlet port to said induction means, said actuator means being movable with said slide member prior to said second valve device to open said outlet port communicating with said induction means by overcoming the bias force of said second biasing means.

22. The apparatus according to claim 17 wherein said housing means defines a first bore for receiving said first valve device and a second bore generally perpendicular to the first bore and configured to receive said induction means.

23. The apparatus according to claim 15 wherein said induction means further comprises a jet sleeve defining an internal passageway, and having a plurality of openings extending through the wall of the sleeve to provide communication between the internal passageway and said first valve device, a tapered jet needle means positioned within said internal passageway in said jet sleeve, said jet needle means being so positioned that pressurized fluid flowing therearound at relatively high speeds flows through said sleeve past said jet needle to create an area of sub-atmospheric pressure within said internal passagewy, such that the sub-atmospheric pressure is sufficient to draw air from the confined space through said openings in said jet sleeve whenever said valve means enables communication between the confined space and said induction means.

24. The apparatus according to claim 15 wherein said induction means includes a jet sleeve defining an internal passageway, and a conical jet needle of tapered configuration supported within the internal passageway of said jet sleeve, said jet sleeve being positioned within said second bore such that said jet needle creates an area of sub-atmospheric pressure within said internal passageway in said jet sleeve due to the curvature of said tapered jet needle, said jet sleeve having at least one opening adjacent said area of low pressure for enabling the confined space to communicate with the low pressure area to produce at least a partial vacuum therein.

25. The apparatus according to claim 17 further comprising means for measuring and visually displaying the pressure in the confined space, and said first valve device further comprises coupling means operatively connected to said monitoring means for allowing the monitoring means to be rotatable in a plane perpendicular to the housing means.

26. The apparatus according to claim 17 wherein said first valve device further comprises a tapered nozzle adapted to plug a pipe opening of several sizes for communicating with a pipe defining a confined space and for selectively providing at least a partial vacuum in the confined space.

27. An apparatus for creating at least a partial vacuum in a member defining an internally confined space comprising a housing means having a first section and a second section being angled relative to said first section and configured for gripping selectively communicable in pneumatically sealed relation with an opening communicating with the confined space; induction means operatively connected to said housing and capable of inducing a sub-atmosphere fluidic pressure when a gas at elevated pressures is directed into said housing and to said induction means; means to selectively supply gas at elevated pressures to said housing to enable the induction means to induce sub-atmospheric pressure therein; and valve means positioned within said housing means and including at least a first valve device operatively automatically movable along a predetermined linear path generally parallel to the axis of said first housing section to an open position wherein the confined space and said induction means are in fluidic communication for enabling drawing of at least a partial vacuum in the confined space, and being automatically movable by fluidic pressure forces generated within the housing means to a closed position within said housing means when said supply of gas at elevated pressures is discontinued wherein said valve means seals off the confined space from said induction means; a vacuum gauge pneumatically operatively connected to said housing and confined space for monitoring the sub-atmospheric pressure in the confined space so as to detect fluidic leaks in said confined space when said sub-atmospheric pressures are induced therein and sealed by said valve device.

28. An apparatus for creating at least a partial vacuum in a member defining a confined space comprising:
(a) a housing;
(b) means to induce at least a partial vacuum within said housing;
(c) an air pressure operated disc valve operatively positioned within said housing for communicating fluidically, said confined space with said at least partial vacuum induction means when said housing is positioned in engaged relation with an opening defined by the confined space, and for sequentially enabling said induction means to initially create at least a partial vacuum within said housing, said valve being movable from a first position permitting communication between the confined space and said vacuum induction means through interconnection means to induce at least a partial vacuum in the confined space, and to a second position which seals off the confined space to enable testing thereof in response to relative movement of said valve means with respect to said housing;
(d) means to selectively supply air at elevated pressures to said housing for creating said at least partial vacuum within said housing in combination with said at least partial vacuum induction means; and
(e) means rigidly connected to said housing for engaging the member for permitting passage of air to said housing and said air pressure operated disc valve from the confined space.

29. The apparatus according to claim 28 wherein said housing further defines at least two internal bores and said induction means comprises a jet sleeve and a conical tapered jet needle positioned and supported within the jet sleeve with its blunt end facing the supply of air of elevated pressures, said jet sleeve being snugly received within one of said bores of said housing and being configured to enable pressurized air directed to said housing to flow therethrough and around said jet needle to create at least a partial vacuum within said jet sleeve and the confined space communicating therewith due to the increased velocity of the air flowing past said needle.

30. An apparatus for creating and monitoring at least a partial vacuum in a pipe member defining a confined space to detect air leaks therein which comprises:

(a) a housing defining first and second generally perpendicular internal bores selectively communicable with each other;
(b) a third bore selectively communicable with at least a portion of said first and second bores;
(c) a jet sleeve positioned within said third bore and having means to selectively communicate the inner portion with the confined space;
(d) a generally conically tapered jet needle positioned within said jet sleeve and having a configuration to produce sub-atmospheric pressure within said jet sleeve and said confined space when air is forced into said housing and through said jet sleeve at relatively elevated pressures and in a direction facing the blunt end of the needle due to the relatively elevated velocity of the air passing through the jet sleeve and past the jet needle;
(e) vacuum monitoring means secured to said housing and adapted to monitor the relatively low atmospheric pressures produced therein;
(f) valve means including:
(1) a first valve device positioned within at least one of said bores and selectively movable from a first closed position permitting communication between said first, second and third bores, such that air supplied to said second bore at generally elevated pressures will produce at least a partial vacuum within said jet sleeve; and
(2) a second valve device positioned within said second bore and selectively operable from a closed position to an open position which permits communication between said second and third bores;
(g) conical nozzle means rigidly connected to said housing by interconnection means slidably positioned within said second bore and movable from a first position corresponding to closed first and second valve devices to an open position for said first and second valve devices, said conical nozzle means defining a central opening selectively communicable with said second and third bores and being sealingly insertable into openings of several sizes in said member defining said confined space to be tested;
(h) at least one resilient coil spring to bias each of said first and second valve devices to the closed position; and
(i) means connected to said conical nozzles means for sequentially operating said first and second valve devices respectively when said conical nozzle is moved rearwardly toward said housing by rearwardly directed forces applied thereto;

whereby forcibly inserting said conical nozzle into engaged fluidic sealed relation with said opening in said member to be tested moves said first valve device to its open position causing communication between an external source of pressurized air and said first and second bores permitting compressed air to enter said jet sleeve to create at least a partial vacuum therein, and continued movement of said nozzle sequentially opens said second valve device causing communication between said at least partial vacuum and said confined space, and releasing said first and second valve causes said first and second valve devices to automatically return to their closed positions due to the bias forces of said bias springs, while said at least partial vacuum thus produced within said confined space indicates the existence or absence of air leaks within said member and said confined space.

31. An apparatus adapted to be positioned in adjacent engaged relation with a member defining a confined space for creating at least a partial vacuum in said confined space which comprises: housing means; induction means operatively connected to said housing means for selectively inducing sub-atmospheric fluidic pressure therein; valve means operatively positioned within said housing means to selectively permit fluidic communication between a source of relatively compressed fluid and the housing means and between said induction means and said confined space, said valve means further being movable to a closed position by forces generated within the housing wherein said valve means seals off fluidic communication between the confined space and induction means to maintain the partial vacuum thereby produced in said confined space for enabling testing of said confined space for fluidic leaks and means rigidly connected to said housing for engaging the member for permitting passage of fluid to said housing and said valve means from the confined space.

32. An apparatus adapted to be positioned in adjacent engaged relation with a member defining a confined space for creating at least a partial vacuum in said confined space which comprises: housing means having a first section and a second section, said second section being angled relative to said first section and configured for gripping; induction means operatively connected to said housing means for selectively inducing sub-atmospheric fluidic pressure therein; valve means positioned within said housing means and being selectively operable to permit fluidic communication between a source of relatively compressed fluid and the housing means and between said induction means and said confined space, said valve means including resilient biasing means and at least a first valve device operatively connected to said biasing means and being movable to a closed position by resilient forces generated within the housing by said biasing means to move along a predetermined linear path generally parallel to the axis of said first housing section wherein said valve device seals off fluidic communication between said confined space and induction means to maintain the partial vacuum thereby produced in said confined space for enabling testing of said confined space for fluidic leaks.

* * * * *

UNITED STATES PATENT AND TRADEMARK OFFICE
CERTIFICATE OF CORRECTION

PATENT NO. : 4,109,513
DATED : August 29, 1978
INVENTOR(S) : Donald E. Schott

It is certified that error appears in the above-identified patent and that said Letters Patent are hereby corrected as shown below:

Column 1, line 6, "direction" should read -- detection --

Column 1, line 37, "construction1" should read -- constructional --

Column 10, line 4 (Claim 21, line 4) "actuator and means" should read -- and actuator means --

Column 10, line 28 (Claim 23, line 12), "passagewy" should read -- passageway --

Column 12, line 61 (Claim 30, line 64), "nozle" should read -- nozzle --

Signed and Sealed this

Seventeenth Day of July 1979

[SEAL]

Attest:

Attesting Officer

LUTRELLE F. PARKER
*Acting Commissioner of Patents and Trademarks*